United States Patent
Misener

(10) Patent No.: US 9,083,126 B2
(45) Date of Patent: Jul. 14, 2015

(54) CONFIGURABLE SAFETY LIGHT RECEPTACLE

(71) Applicant: CALM TECHNOLOGIES INC., Kingston (CA)

(72) Inventor: Donald Lowell Misener, Kingston (CA)

(73) Assignee: CALM TECHNOLOGIES INC., Kingston, Ontario (CA)

( * ) Notice: Subject to any disclaimer, the term of this patent is extended or adjusted under 35 U.S.C. 154(b) by 147 days.

(21) Appl. No.: 13/908,397

(22) Filed: Jun. 3, 2013

(65) Prior Publication Data

US 2013/0260613 A1 Oct. 3, 2013

Related U.S. Application Data

(63) Continuation-in-part of application No. 11/848,615, filed on Aug. 31, 2007, now Pat. No. 8,496,342.

(60) Provisional application No. 60/847,185, filed on Sep. 26, 2006.

(51) Int. Cl.
| | |
|---|---|
| *H02G 3/08* | (2006.01) |
| *H02G 3/14* | (2006.01) |
| *H01R 27/02* | (2006.01) |
| *F21S 9/02* | (2006.01) |
| *H01R 13/717* | (2006.01) |
| *F21V 21/002* | (2006.01) |
| *F21V 21/04* | (2006.01) |
| *H02J 9/02* | (2006.01) |
| *H01R 25/00* | (2006.01) |
| *F21Y 101/02* | (2006.01) |

(52) U.S. Cl.
CPC .................. *H01R 27/02* (2013.01); *F21S 9/022* (2013.01); *F21V 21/002* (2013.01); *F21V 21/04* (2013.01); *H01R 13/717* (2013.01); *H02J 9/02* (2013.01); *F21Y 2101/02* (2013.01); *H01R 25/006* (2013.01)

(58) Field of Classification Search
CPC .... H01R 27/02; H01R 13/717; H01R 25/006; H01R 27/00; H01R 29/00; F21S 9/022; F21V 21/002; F21V 21/04; H02J 9/02; H02G 3/08; H02G 3/14; F21Y 2101/02; F21Y 2101/00
USPC ........ 174/50, 53, 57, 58, 66, 67; 220/3.2–3.9, 220/241, 242; 439/535, 536, 653; 362/95, 362/183
See application file for complete search history.

(56) References Cited

U.S. PATENT DOCUMENTS

| | | |
|---|---|---|
| 3,895,225 A | 7/1975 | Prior |
| 4,546,419 A | 10/1985 | Johnson |
| 4,636,914 A * | 1/1987 | Belli ................................ 174/53 |
| 5,473,517 A | 12/1995 | Blackman |
| 5,813,873 A | 9/1998 | McBain et al. |
| 6,000,807 A | 12/1999 | Moreland |
| 6,010,228 A | 1/2000 | Blackman et al. |
| 6,045,232 A | 4/2000 | Buckmaster |
| 6,794,575 B1 | 9/2004 | McBain et al. |

(Continued)

*Primary Examiner* — Angel R Estrada
(74) *Attorney, Agent, or Firm* — Greer, Burns & Crain, Ltd.

(57) ABSTRACT

An electrical receptacle provide outlets and a cavity for receiving an insert. The insert connects to the electrical main through the receptacle and can provide additional functionality through the insert including emergency lighting, night lighting, gas detectors and charging connections.

17 Claims, 8 Drawing Sheets

(56) References Cited

U.S. PATENT DOCUMENTS

| | | |
|---|---|---|
| 6,805,469 B1 | 10/2004 | Barton |
| 7,026,550 B2 | 4/2006 | McBain et al. |
| 7,285,721 B1 * | 10/2007 | Savicki, Jr. .................... 174/50 |
| 7,360,912 B1 | 4/2008 | Savicki, Jr. |
| 7,734,038 B2 * | 6/2010 | Martich et al. .................. 174/50 |
| 7,862,350 B2 * | 1/2011 | Richter et al. .................. 362/95 |
| 8,496,342 B2 * | 7/2013 | Misener .......................... 174/50 |
| 2004/0218379 A1 | 11/2004 | Barton |
| 2005/0136972 A1 | 6/2005 | Smith et al. |

\* cited by examiner

R1 Photo-Resistor
S1 SW-PB-NO

CONFIGURABLE SAFETY LIGHT RECEPTACLE

CROSS REFERENCE TO RELATED APPLICATIONS

This application claims the benefit of U.S. Provisional Application No. 60/847,185 filed Sep. 26, 2006 entitled "Configurable Safety Light Receptacle" and U.S. patent application Ser. No. 11/848,615 filed Aug. 31, 2007 entitled "Configurable Safety Light Receptacle", each of which are incorporated herein by reference.

FIELD OF THE INVENTION

This invention relates generally to electrical wall receptacles. In particular, this invention relates to replacement wall receptacles that can house specific function inserts having common mechanical and electrical interfaces.

BACKGROUND OF THE INVENTION

In most conventional buildings, both residential and commercial, electrical receptacles are spaced out on walls at fixed intervals. This allows for convenient distribution of power, but does not typically provide any additional functionality. Each receptacle typically provides two outlets. The style of the provided outlet is usually determined by geographical location and the electrical standards of region.

In many buildings, emergency lighting is required to provide a means for navigating in the dark. There are two common needs for navigation in the dark. The first is a conventional night light situation, whereby a light is required to provide illumination in a dark environment on a regular basis; the other is for backup lighting. Backup lighting is also referred to as blackout lighting, and is required when there is a lower failure and lighting cannot be turned on.

The prior art has attempted to address this situation by developing a number of solutions including both nightlights and rechargeable lights. Nightlights are typically plugged-in to one of the outlets provided in a standard receptacle. They often include switches, that can be either photosensitive or manually controlled. This allows the nightlight to be deactivated during daylight when it is not needed. Rechargeable lights are also designed to be connected to an outlet. Many of these lights will activate when they are no longer in a charging state. Thus, a rechargeable flashlight of this design will activate both upon being unplugged and upon a power failure.

One problem with both of these designs is that they consume an electrical outlet, and require external components that can be removed and accidentally disconnected. Thus, an integrated solution provides advantages.

Backup lighting is necessary to ensure that individuals can safely navigate through dark and even unfamiliar locations. The need for these lights to operate on emergency power is increased in locations such as hospitals, nursing homes, and both industrial and commercial buildings in which individuals may be unfamiliar with floor plans and layouts. Residential homes benefit from emergency lighting as it enables homeowners, residents, and guests to safely navigate the home when power outages occur. Emergency rescue personnel are often hampered by the lack of knowledge of floor designs, increasing the time and effort required to rescue people from potentially dangerous situations.

Many solutions to backup lighting involve a dedicated lighting unit connected to the electrical power main. When a loss of power is detected, these systems turn on. Although they provide blackout lighting, they require additional wiring, which is inconvenient during construction, and expensive as a retrofit. The external units are often unsightly and are single purpose infrastructure items that serve no function other than emergency lighting.

A key limitation of conventional emergency lighting, especially considering residential utilization, is installation of bulky and generally unappealing systems that require direct access to electrical outlet. In addition, these conventional emergency lights have a single operational function and hence cannot be tailored different emergency lighting scenerios (ie power loss, low-light illumination, smoke/fire detection). In addition, alternate lighting can be provided by external devices (ie a night light plugged into a receptacle) however, these tend to be bulky and diminish the use of the wall receptacle for other purposes.

Thus, there remains a need for discrete emergency lighting that can automatically illuminate and can allow a user enough flexibility to select the appropriate emergency illumination situation.

Prior art attempts at addressing this need are discussed below. Typically they do not provide a sufficiently integrated and flexible system.

U.S. Pat. Nos. 6,010,288 and 6,000,807 both describes a light switch plate and wall receptacle plate that are installed in place of the normal flush mounted plastic cover plates. While generally easy to install as this senses the absence of power wirelessly, this type of fixture plate (in both thickness and length) is bulky, potentially unappealing and only has the power outage lighting feature via LED lights. Similarly U.S. Pat. No. 5,473,517 also use this same type of bulky light switch plate but utilizes direct connection to 120 VAC to sense the presence or absence of power to both with the illumination source being a relatively inefficient fluorescent tube arrangement.

U.S. Pat. No. 6,045,232 describe an emergency light arrangement that has both the capability of providing lighting for power out conditions and night light for illumination during low light levels. While this does have expanded utility as it provides more than just one type of emergency lighting and does not utilize bulky plates, this is a direct replacement of the wall receptacle removing the ability to use this as a normal outlet. This then precludes the use of this in certain locations where there are limited numbers of wall receptacles.

U.S. Pat. No. 6,805,469 describes the complete replacement of the internal wall receptacle and light switch units with a custom light switch and wall receptacle that internally contain the electronics and batteries for an emergency light. Both arrangements use illumination (light switch via the toggle, wall receptacle via the face of the receptacle body) during power out conditions and conform to the size and shape of normal light and wall receptacles, thus maintaining the normal appearance. However, both have only one possible function and importantly, when the batteries require replacement or the device has failed and requires replacement, the user must disassembly the unit from the electrical box creating a potential safety hazard for the user.

Thus there remains a need for an emergency lighting system that conforms to the normal configuration these standard wall receptacles, contain a level of flexibility to allow the user to select the desired functions, maintain the full use and capability of the substituted wall receptacle, and is easy and safe for the user. In addition, as technology changes and advances, there also is a need to ensure that the state-of-the-art can be utilized with minimal user cost or change to the installed system.

SUMMARY OF THE INVENTION

It is an object of the present invention to obviate or mitigate at least one disadvantage of the prior art.

In a first aspect of the present invention, there is provided an electrical receptacle for mounting in a wall or receptacle box, the receptacle having an externally accessible face. The receptacle comprises an electrical main connection point, an electrical out, a cavity and a removable insert. The electrical main connection point connects the receptacle to the electrical main. The electrical outlet is connected to the electrical main connection point and is set into the externally accessible face. The outlet has a standard interface for connecting external loads to the electrical main. The cavity is set into the externally accessible face of the electrical outlet, and has a connection to the electrical main connection point. The cavity receives inserts and connects them to the electrical main. The removable insert is sized for insertion in to the cavity, and receives power from the electrical main through the connection to the electrical main connection point.

In embodiments of the first aspect of the present invention, the cavity and the insert include cooperating latches for releasably locking the insert into the cavity. In other embodiments, the insert includes a battery-powered light activated when power from the electrical main is not present. Optionally, the insert includes a battery charger for charging the battery connected to the battery powered light when power from the electrical main is present. In further embodiments, the insert includes a light activated by a photosensor. In other embodiments, the insert includes a current converter, such as a transformer, and a socket. The current converter receives power from the electrical main and converts the power to a direct-current signal. The socket, which may be a universal serial bus socket, is connected to the current converter and provides external access to the direct current signal. In other embodiments, the insert can include either a wireless network bridge or a powerline networking bridge connected to an externally accessible network jack. The insert can also provide a further outlet, either directly on the face of the receptacle on through an extension cord.

In a second aspect of the present invention, there is provided an electrical receptacle for mounting in a wall or receptacle box, the receptacle having an externally accessible face. The receptacle comprises an electrical main connection point, an electrical outlet and a cavity. The electrical main connection point connects the receptacle to the electrical main. The electrical outlet is connected to the electrical main connection point and is set into the externally accessible face. The outlet has a standard interface for connecting external loads to the electrical main. The cavity is set into the externally accessible face of the electrical outlet, and has a connection to the electrical main connection point. The cavity is sized for receiving inserts and connects the inserts to the electrical main.

In embodiments of the second aspect of the present invention, the receptacle includes a second electrical outlet set into the externally accessible face. The cavity can be centrally located between the two electrical outlets on the externally accessible face. The cavity can include a latch for interacting with a cooperative element on an insert to prevent accidental removal of an inserted insert. The cavity can include a connection point not connected to the electrical main connection point, such as a computer network connection point. The connection point can alternatively be used to provide an interface for controlling the connection of the electrical outlet to the electrical main.

In a third aspect of the present invention, there is provided an insert, for insertion into a cavity in the face an electrical receptacle. The insert comprises electrical contacts and a substrate. The electrical contacts connect to the receptacle and draw electrical power from an electrical main connected to the receptacle. The substrate supports the electrical contacts.

In embodiments of the thirds aspect of the present invention, there is provided a latch, connected to the substrate, for mating with a respective latching system in the cavity to prevent accidental removal of the insert.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

The present invention is directed to a configurable receptacle, which can be configured with a variety of function specific inserts such as safety lights and motion detectors.

Reference is made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

Systems of the present invention provide a mechanism for making use of standard building wiring to provide additional functionality including emergency lighting. In one embodiment of the present invention, a modification to the design of an electrical receptacle is provided. This redesign allows for an insert to be placed into a cavity in the receptacle body. A standard electrical receptacle provides two outlets. When installed in a receptacle box, the receptacle is typically covered by a faceplate. It is preferable for the receptacle of the present invention to function with standard receptacle boxes, and in some designs faceplates.

Figure 1:
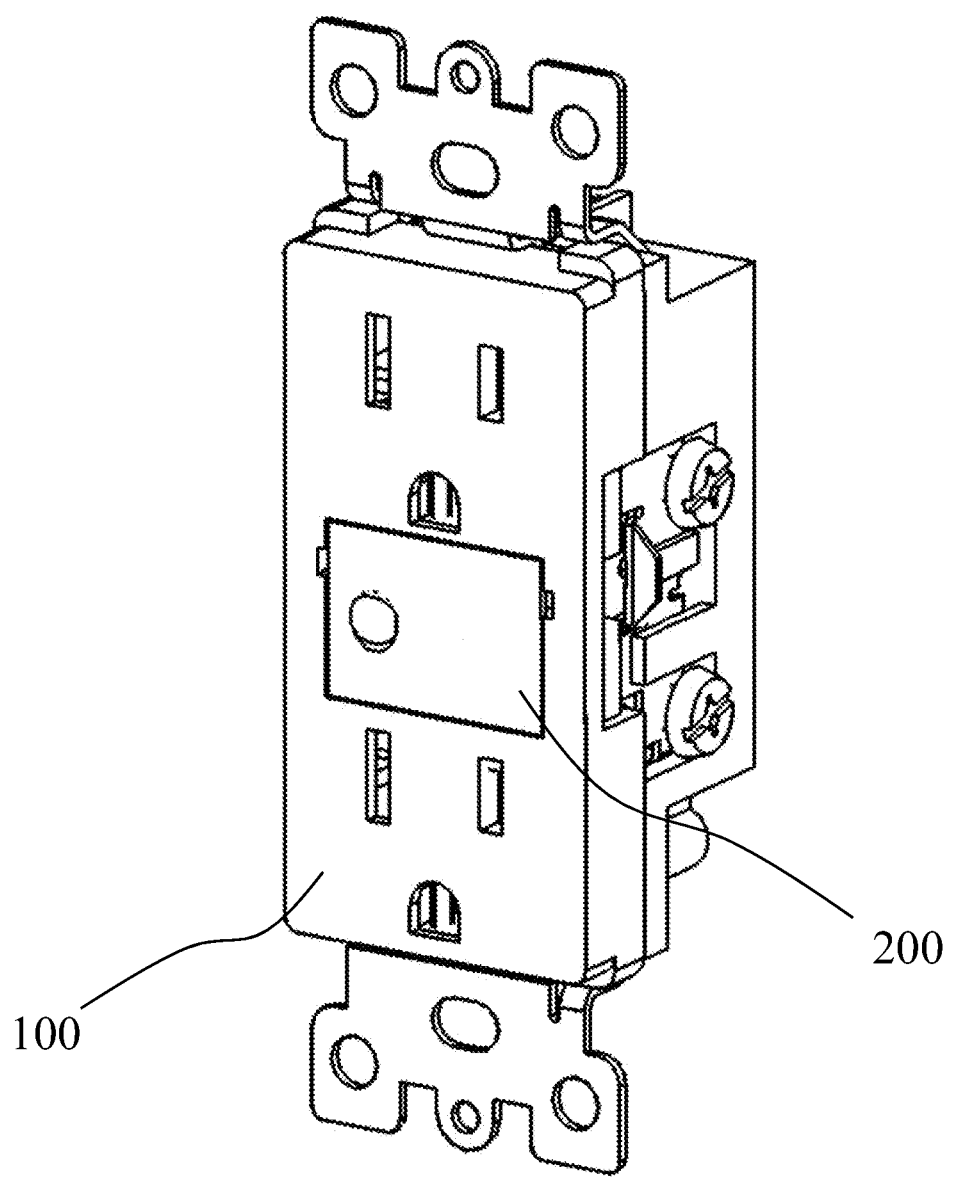
FIG. 1 illustrates the assembled wall receptacle and insert according to an embodiment of the present invention.

As illustrated in FIG. 1, receptacle body 100 has been modified to accept insert 200. The receptacle body 100 provides two outlets in what is referred to as a decora-style configuration. In this configuration, the outlets are vertically spaced from each other, and a faceplate serves to surround the central structure that houses the outlets. In such a configuration, insert 200 is placed into a cavity between the two outlets. A decora-style faceplate can be attached to the receptacle without any modification. This allows for compatibility with a large number of existing elements, and allows for easy retrofitting. A building can be retrofit to these receptacles with no tools other than a standard screwdriver.

Figure 2:
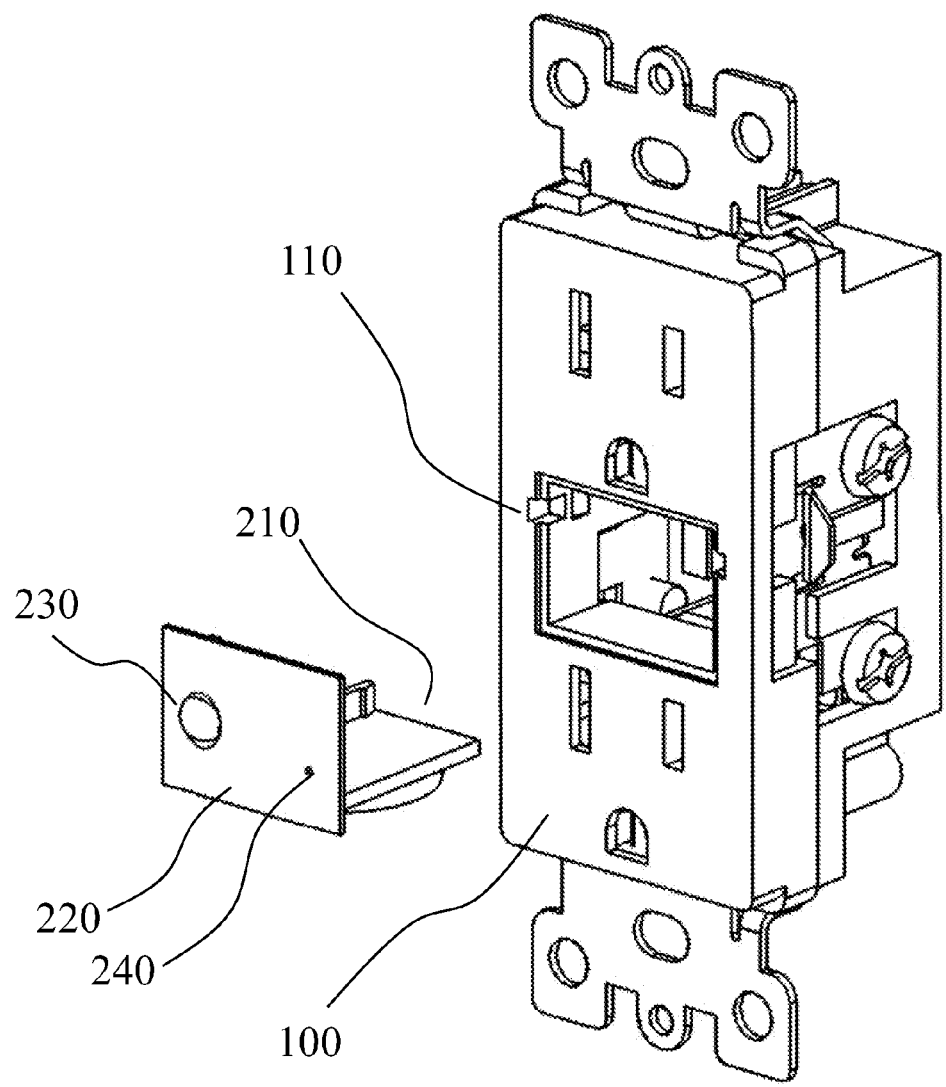
FIG. 2 shows the insert of FIG. 1 removed from the interface cavity in the wall receptacle.

FIG. 2 provides an exploded view of the receptacle 100 and insert 200. Insert 200 is inserted into cavity 110 in receptacle 100. As noted above, receptacle 100 can be accommodated into a standard decora-style faceplate. Insert 200 provides a physical an electrical interface for various insert configurations, each of which can provide alternate functionality. In the illustrated embodiment, insert 200 provides illumination, although alternate inserts can provide other functions such as chargers for different connection, additional outlet, smoke detectors, and other functions that will be apparent to those skilled in the art. Insert 200 includes a printed circuit board 210 that houses the control circuitry and elements for the intended functionality. Faceplate 220 provides a cover that preferably matches with surface of the receptacle. On the faceplate is provided a light 230, preferably a light emitting diode (LED), and a test switch 240 which can be used to determine if the insert is functional.

Figure 3:
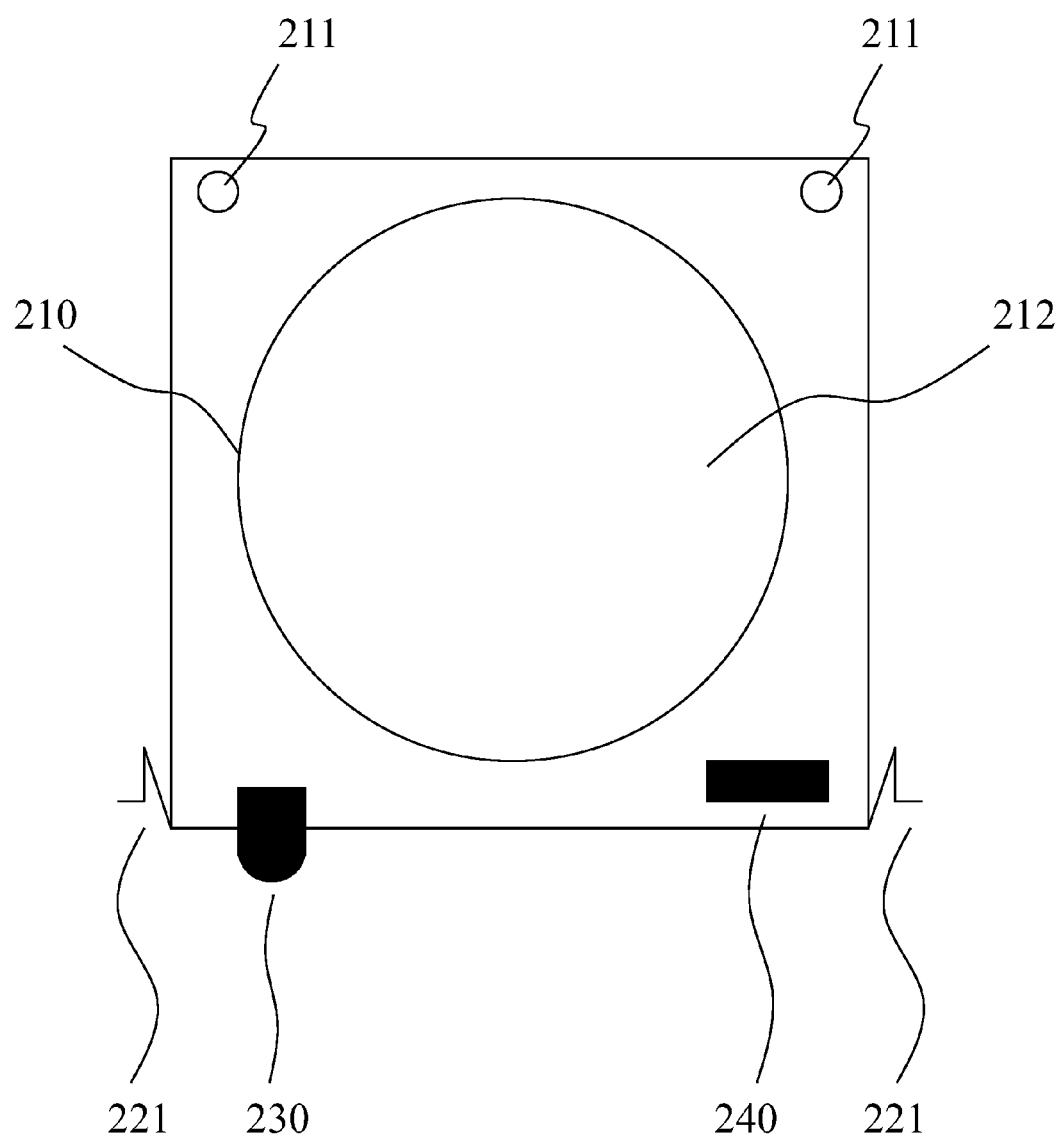
FIG. 3 is a representation of an exemplary layout of components on the insert.

As shown in FIG. 3, PCB 210 includes contacts 211 that are connected to the electrical main that the outlets of the receptacle are connected to. This provides PCB 210, and any circuitry thereupon, with power. As illustrated in FIG. 3, embodiments of the present invention can provide a battery 212 on the PCB 210. Battery 212 is used to provide LED 230 with power during blackout situations. Contacts 211 provide a mechanism for connection to the 120 VAC once the insert 200 is fully inserted in the receptacle body 100. Although reference is made herein to 120 VAC as a source, it will be understood that other power standards can be used with suitable modifications to electrical designs on the inserts. The assembled insert 200 is held into the receptacle body 100 by mounting mechanisms such as plastic latches 221 on the insert cover plate 220. These latches provide the necessary protection from accidental removal and child protection as the removal of this embodiment of the present invention requires a small screwdriver or specialized tool on both the left and right side of the insert cover plate 220 to unlock the latches 221 for removal. Note that dependent on the insert function, all or a portion of these elements may be present.

Figure 4:
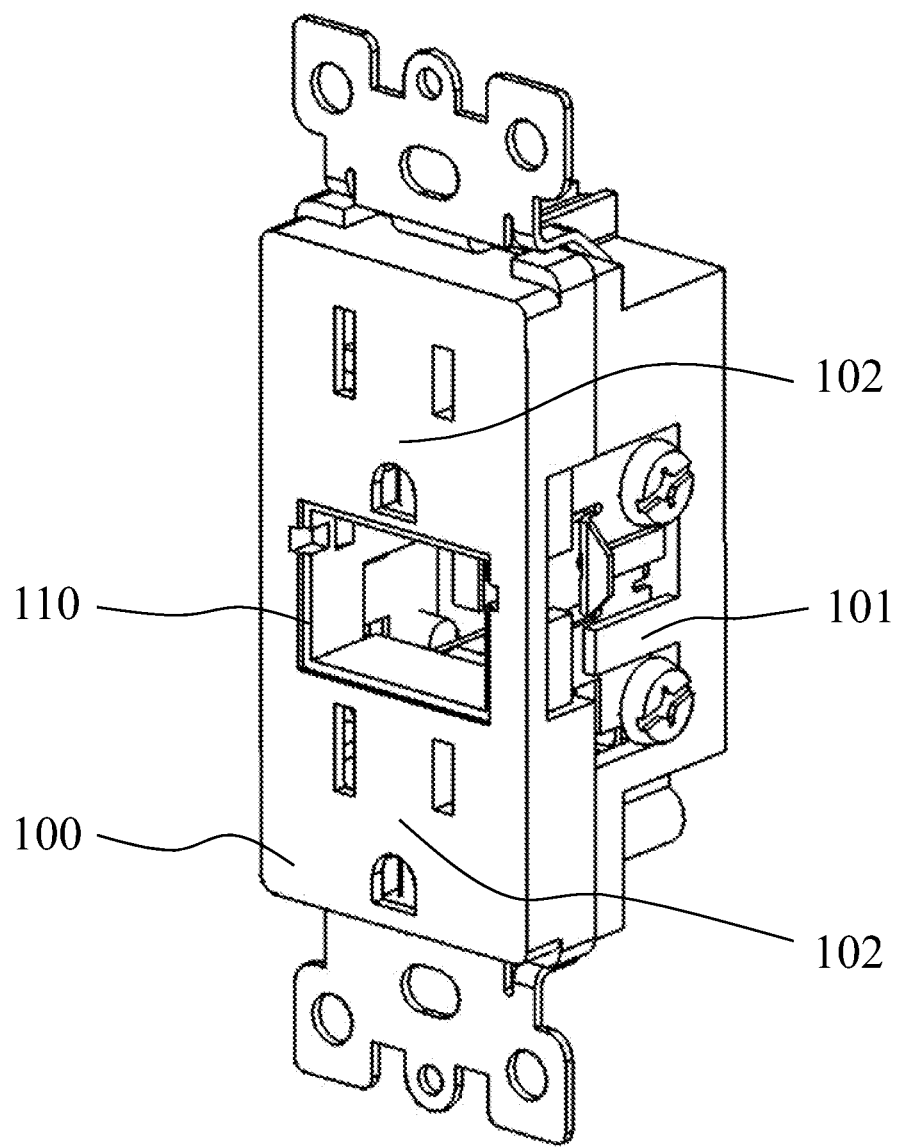
FIG. 4 shows a wall receptacle according to an embodiment of the present invention with the insert removed.

As shown in FIG. 4, the receptacle body 100 provides the insert cavity 110 and the nominal wall receptacle interfaces for normal 120 VAC power via the receptacle plugs 102 and installation screw terminals 101.

Figure 5:
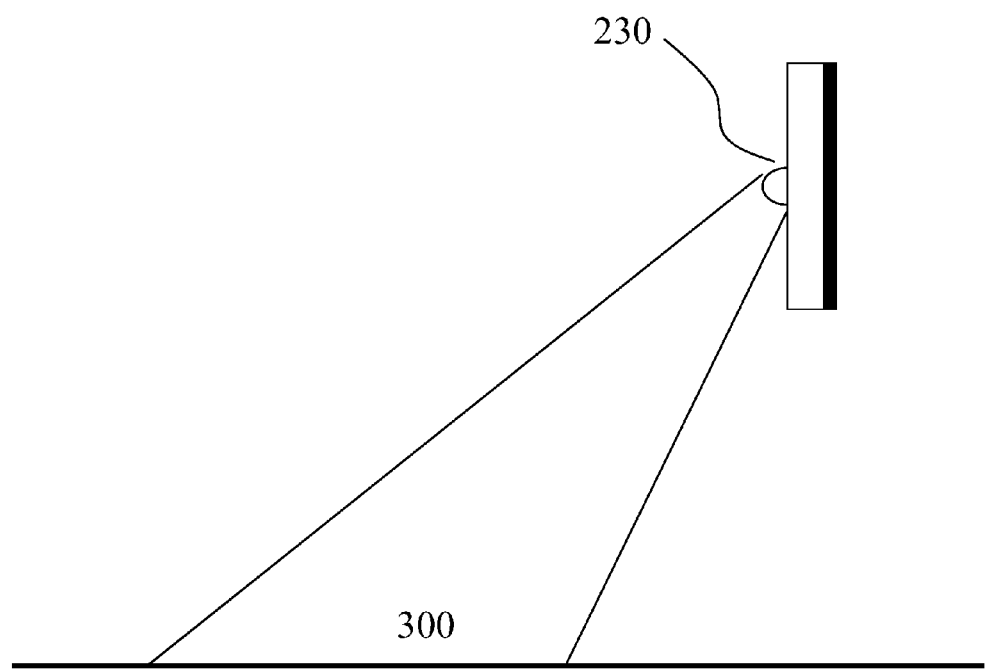
FIG. 5 illustrates the floor illumination of an embodiment of the present invention.

For illumination-based inserts, a high intensity LED 230 provides floor illumination 300 as indicated in FIG. 5. Although this does may not provide the same degree of illumination as a dedicated emergency blackout light, a large number of distributed lights can be employed. This provides a distributed lighting in a room as opposed to a large centralized point source of light. If light 230 makes use of LEDs, as illustrated in the embodiments, the power-on time provided by the battery can exceed the time provided by a conventional battery backup light that makes use of halogen or standard incandescent lighting.

Below, exemplary designs for functional inserts are provided. One skilled in the art will appreciate that alternate designs are possible, as are designs for functions not described herein.

Figure 6:
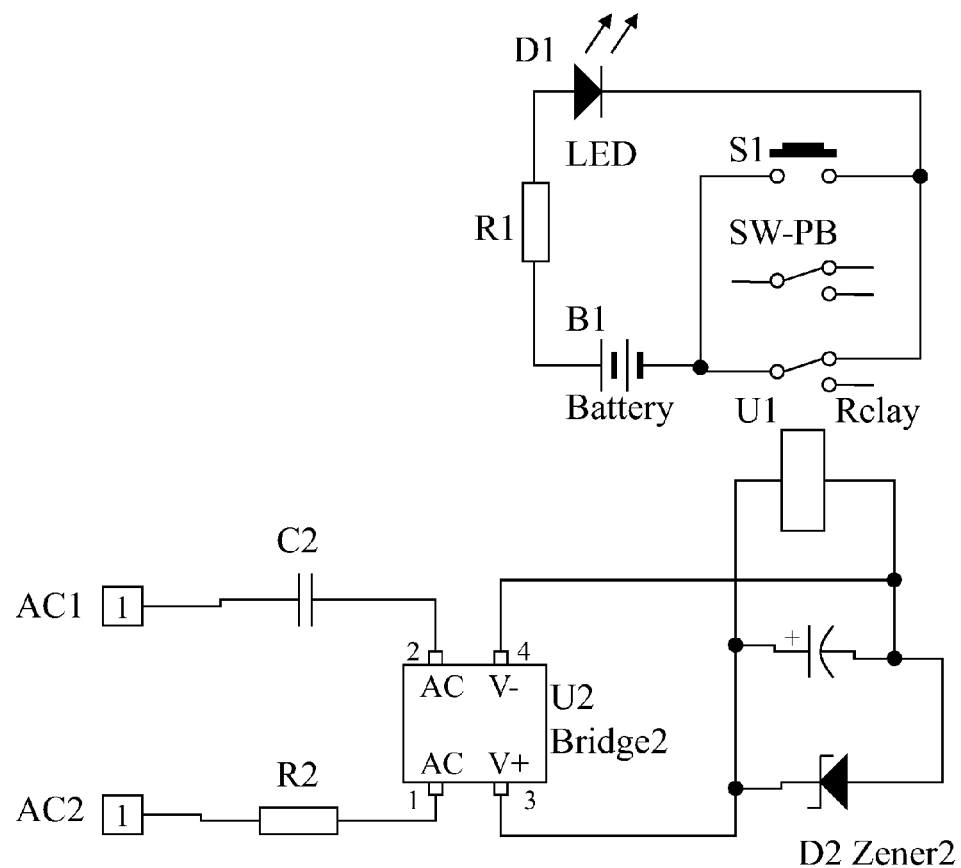
FIG. 6 is an illustrative circuit diagram for use in an embodiment of a power out lighting insert.

FIG. 6 illustrates a relay-based schematic for illumination during power out conditions. In operation, the design presented obtains a low power rectified signal from the 120 VAC main voltage. Note that for 220-240AC, C2 is decreased in half. Connection to the receptacle is provided by contacts AC1 and AC2. The rectified voltage powers a relay such that the NO contact is engaged which disconnects the battery from the LED. When power is removed (i.e. a power black-out) the relay triggers the NC contact and the LED illuminates for as long as power is off or until the battery is drained (>60 hours). At any time, the LED and battery can be tested via an external push button. Higher illumination intensity can be achieved by reducing R1—note this would reduce the total illumination time. In an alternate embodiment, a rechargeable battery can be used and can be charged during non-blackout periods.

Figure 7:
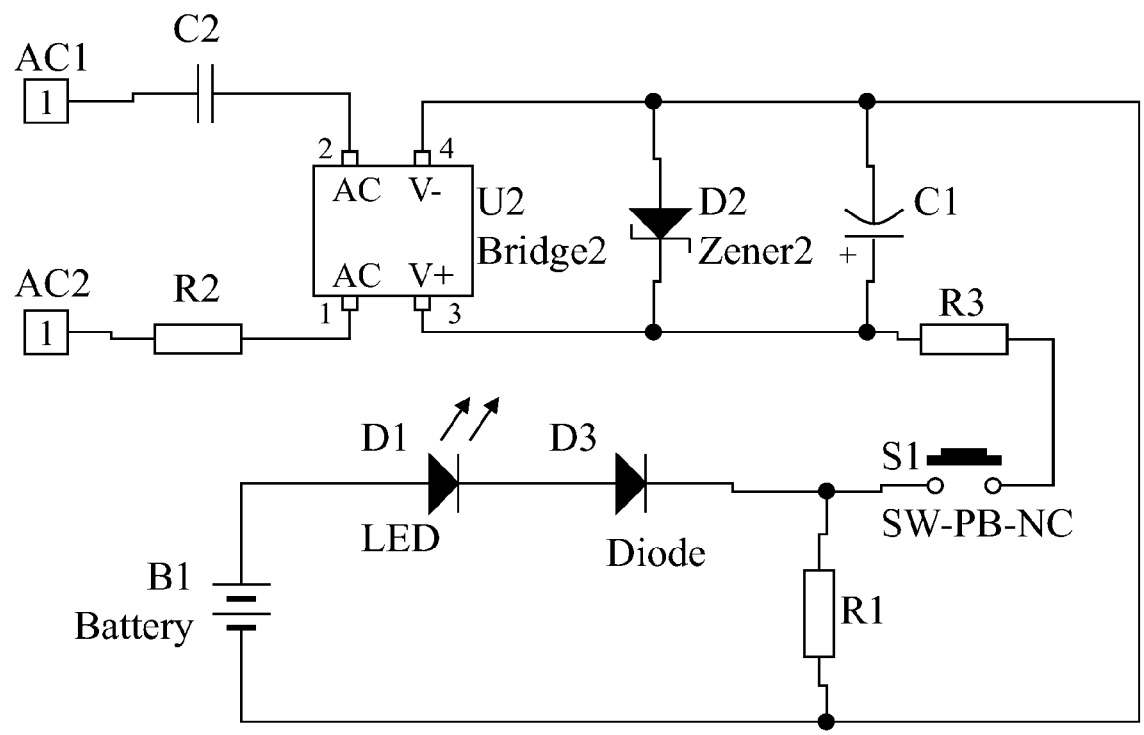
FIG. 7 is an exemplary diode-based power out illumination insert circuit design.

FIG. 7 illustrates an exemplary diode biased based schematic for illumination during power out conditions. While performing the same emergency lighting function, the relay has been removed and a passive voltage difference is used to enable or disable the LED light. In operation, a low power rectified signal is obtained from the 120 VAC main voltage. Note that for 220-240AC, C2 is decreased in half. This rectified voltage generates a potential between R3 and R1 that is higher than the battery voltage (3V). This creates a reverse bias state in diodes D3 and D1. In this reverse bias state, current cannot flow from the battery to the LED. When power is removed (i.e. power black-out) the higher voltage potential is removed, power can flow from the battery, and the LED illuminates for as long as power is off or until the battery is drained (>60 hours). At any time, the LED and battery can be tested via an external push button. Higher illumination intensity can be achieved by reducing R1—note this would reduce the total illumination time.

Figure 8:
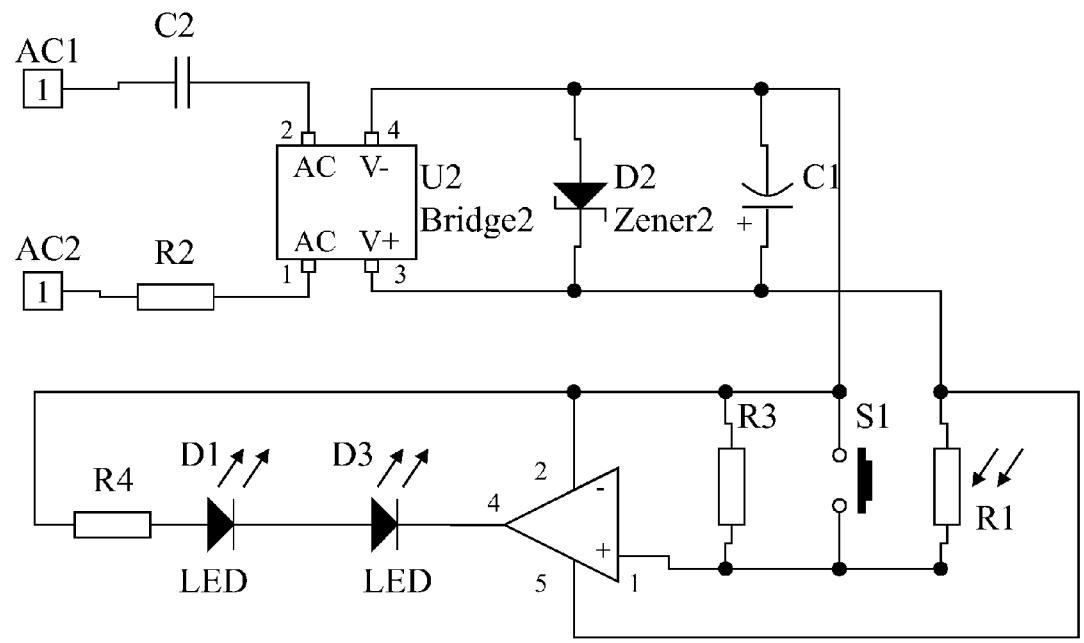
FIG. 8 is an exemplary night light insert circuit design.

FIG. 8 illustrates a Night Light insert. In operation, the design presented obtains a low power rectified signal from the 120 VAC main voltage. Note that for 220-240AC, C2 is decreased in half. The 6.3V rectified voltage is used to power the circuit and drive the LED's. The R1/R3 voltage divider generates a input to the Voltage Comparator. The photoconductive cell has an impedance of 1M in the dark and 45K in the light. Internal to the voltage comparator is a 1.24Vref, so during the day (i.e. lighted conditions) the input voltage to the comparator would be between 3.0 and 2.0V. Once the light is sufficiently reduced, the impedance of R1 is decreased, the voltage input drops below 1.24V the LED's illuminate. One skilled in the art will appreciate that the photoconductive cell act as a photosensor to determine ambient light levels. When a threshold is crossed, the photosensor activates or deactivates the light as required. Numerous other implementations will be understood by those skilled in the art.

Other, non-illustrated inserts are contemplated. As the insert provides a mechanism for drawing power from the 120 VAC main, a number of different inserts can be provided. Rechargeable devices, such as cellular phones, can provide inserts that allow charging without occupying an outlet. Many devices now draw power for charging from a standard Universal Serial Bus (USB) connection. Typically a Type A connector to a computer or to a power converter is used to connect to a device. A current converter insert that transforms the AC current to a DC current and provides a USB connection can be provided to allow for charging devices such as cellular phones, cameras, portable music players and other electronic devices. The current converter be implemented using any of a number of standard devices including transformers, rectifiers and other devices that will be well known to those skilled in the art.

Computer network connections can be provided in inserts. Additional contacts can be provided so that computer networking cabling can be connected to the receptacle and accessed through the insert. Alternatively, power-line networking connections can be provided using industry standard interfaces. Such a design provides network connectivity to any location that a computer would need to be plugged in to an outlet. In an alternate embodiment, a network jack can be provided. To connect to a network, a wireless transceiver can be employed, and powered from the contacts connecting to the electrical main. The wireless connection can be any of a number of standard connections, such as any of the IEEE802.11 family of standards, or even using a wide area networking standard such as WiMax. Alternatively, a proprietary networking standard can be provided.

Although reference has been shown to providing only two contacts, in view of the above discussion multiple contacts can be provided for any number of reasons. One skilled in the art will appreciate that a third contact to the electrical main can be provided to offer grounded connections. This allows the insert to connect to a cable that provides further outlets. Thus, a receptacle can provide standard outlets, and through the use of the insert can provide further outlets.

In an alternate embodiment, the receptacle provides a single outlet, and provides at least one insert connection point. Thus, in the shape of a conventional outlet, and allowing compatibility with a standard receptacle, a single outlet can be provided with multiple inserts.

Further insert designs for motion detectors, security system sensors, smoke detectors, radon detectors, noxious gas detectors such as carbon dioxide detectors, carbon monoxide detectors and natural gas detectors, have been contemplated and can be implemented by those skilled in the art by placing standard designs for these system on an insert and drawing electrical power from the power main.

The additional contacts can be employed for any number of uses. In one embodiment, the extra connectors allow a timer insert to control the availability of the outlets in accordance with a predefined schedule. A receptacle can make use of logic circuitry to identify the insert using a set of contacts, and then handle the signals from the contacts appropriately. This allows a single set of contacts to be used for both outlet control, such as with a timer insert, and for other purposes such as networking, or other communications activities.

One skilled in the art will appreciate that the present invention provides not only for designs of inserts, but also for receptacles that accept such inserts. By providing power to an insert in a receptacle, a variety of components can be distributed through a commercial or residential environment. Because they do not require external access to a power supply, they provide a simpler and more pleasing installation. Thus, motion detectors can be installed and powered off the connection, and can be connected to security systems. Because installation of these receptacles can be done during construction, or as a retrofit, data connections to systems such as security systems can be provided using either a wired or wireless connection. Power line communication can also be employed.

Inserts can be provided with processors and communications interfaces so that a set of co-located inserts can communicate and provide functionality based on conditions at a number of different inserts.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A device for use in conjunction with a conventional electrical utility work box and a faceplate comprising:
    a housing to fit within an electrical utility work box comprising at least a front face, the housing comprising;
    a first mounting means to affix the housing to the electrical utility work box;
    a second mounting means to affix the faceplate to the housing;
    a plurality of electrical interfaces, each electrical interface allowing connection to a predetermined electrical signal forming part of an electrical utility supply;
    an electrical outlet disposed within the front face of the housing forming a permanent part of the housing, the electrical outlet permanently connected to the plurality of electrical interfaces and allowing external loads to be connected to the electrical utility supply when the housing is connected to the electrical utility supply with the faceplate attached, the electrical outlet accessible through a first opening in the faceplate;
    a cavity disposed within the front face of the housing allowing the insertion and removal of a demountable insert when the housing is mounted within the electrical utility work box with the faceplate attached and comprising a first part of a retention means to retain the demountable insert when inserted into the cavity, the cavity accessible through a second opening in the faceplate and comprising a plurality of first contacts, each first contact electrically coupled to a predetermined electrical interface of the housing;
    the demountable insert sized for insertion into the cavity within the front face of the housing and providing a function independent of the electrical outlet, the demountable insert capable of insertion and removal when the faceplate is attached to the housing, the demountable insert comprising a second part of the retention means to retain the demountable insert when inserted into the cavity;
    the demountable insert comprising a plurality of second contacts, each second contact providing electrical connection to a predetermined first contact of the plurality of first contacts when the demountable insert is inserted into the cavity within the housing;
    the demountable insert comprising a power converter for converting the electrical utility supply to a predetermined direct-current electrical signal; and
    the demountable insert comprising an electrical interface according to a predetermined standard allowing external electrical loads to be connected to the electrical interface whilst the demountable insert is inserted into the housing with the faceplate attached.

2. The device according to claim 1 wherein,
    the demountable insert further comprising a control circuit, the control circuit coupled to a predetermined functional subset of elements, the elements comprising an optical emitter, an optical sensor, a chemical sensor, a biological sensor, a motion sensor, a rechargeable battery, a gas detector, a microphone, and a loudspeaker.

3. The device according to claim 1 wherein,
    the housing comprising a second electrical outlet disposed within the front face of the housing forming a permanent part of the housing, the second electrical outlet permanently connected to the plurality of electrical interfaces and allowing external loads to be connected to the electrical utility supply when the housing is connected to the electrical utility supply with the faceplate attached, the second electrical outlet accessible through a third opening in the faceplate.

4. The device according to claim 1 wherein,
the demountable insert includes an interface according to a predetermined standard, the interface allowing at least one of:
allowing external control of the connection of the electrical outlet to the electrical utility supply when the demountable insert is inserted into the housing with the faceplate attached;
connection of an external device to a computer network via the electrical utility supply; and
connection of an external device to a computer network coupled to the housing via a communications interface.

5. The device according to claim 1 wherein,
the demountable insert is a wireless networking bridge operating according to a first predetermined wireless standard, the wireless networking bridge at least one of:
connected to an externally accessible network jack;
connected to an externally accessible socket;
connected to a wireless network operating according to a second predetermined standard.

6. The device according to claim 1 wherein,
the demountable insert comprises an electrical mains interface allowing external loads to be connected to the electrical utility supply, the electrical mains interface at least one of according to a standard other than that of the electrical utility supply and an externally accessible socket of the insert connected to the insert by an electrical cable.

7. The device according to claim 1 wherein,
the housing further comprises a second cavity disposed within the front face of the housing allowing the insertion and removal of another demountable insert when the housing is mounted within the electrical utility work box with the faceplate attached and comprising the first part of the retention means to retain the other demountable insert when inserted into the second cavity, the second cavity accessible through a fourth opening in the faceplate and comprising a plurality of third contacts, each third contact electrically coupled to a predetermined electrical interface of the housing.

8. A device for use in conjunction with a conventional electrical utility work box, a housing for mounting to the conventional electrical utility box and a faceplate for mounting to the housing comprising:
a demountable insert sized for insertion into a cavity within a front face of the housing facing a user when mounted to the electrical utility box and providing a function independent of an electrical outlet within the housing, the demountable insert capable of insertion and removal from the housing through an opening within the faceplate when the faceplate is attached to the housing and the housing is mounted within the electrical utility work box, the cavity within the housing also comprising a first part of a retention means and the demountable insert comprising a second part of the retention means to retain the demountable insert when inserted into the cavity within the front face of the housing; and
the demountable insert includes an interface according to a predetermined standard, the interface allowing at least one of:
allowing external control of the connection of the electrical outlet to the electrical utility supply when the demountable insert is inserted into the housing with the faceplate attached;
connection of an external device to a computer network via the electrical utility supply; and
connection of an external device to a computer network coupled to the housing via a communications interface.

9. The device according to claim 8 wherein,
the demountable insert further comprises a plurality of second contacts, each second contact providing electrical connection to a predetermined first contact of a plurality of first contacts disposed within the cavity within the housing when the demountable insert is inserted into the cavity within the housing, wherein each first contact electrically coupled to a predetermined electrical interface within the housing that supports connection to a predetermined electrical signal forming part of an electrical utility supply.

10. The device according to claim 8 wherein,
the demountable insert includes power converter for converting the electrical utility supply to a predetermined direct-current electrical signal; and
the demountable insert includes an electrical interface according to a predetermined standard allowing external electrical loads to be connected to the electrical interface whilst the removable insert is inserted into the housing with the faceplate attached.

11. The device according to claim 8 wherein,
the demountable insert further comprises a control circuit, the control circuit coupled to a predetermined functional subset of elements, the elements comprising an optical emitter, an optical sensor, a chemical sensor, a biological sensor, a motion sensor, a rechargeable battery, a gas detector, a microphone, and a loudspeaker.

12. The device according to claim 8 wherein,
the demountable insert is a wireless networking bridge operating according to a first predetermined wireless standard, the wireless networking bridge at least one of:
connected to an externally accessible network jack;
connected to an externally accessible socket;
connected to a wireless network operating according to a second predetermined standard.

13. The device according to claim 8 wherein,
the demountable insert comprises an electrical mains interface allowing external loads to be connected to the electrical utility supply, the electrical mains interface at least one of according to a standard other than that of the electrical utility supply and an externally accessible socket of the insert connected to the insert by an electrical cable.

14. A device for use in conjunction with a conventional electrical utility work box and a faceplate comprising:
a housing to fit within an electrical utility work box comprising at least a front face, the housing comprising;
a first mounting means to affix the housing to the electrical utility work box;
a second mounting means to affix the faceplate to the housing;
a plurality of electrical interfaces, each electrical interface allowing connection to a predetermined electrical signal forming part of an electrical utility supply;
an electrical outlet disposed within the front face of the housing forming a permanent part of the housing, the electrical outlet permanently connected to the plurality of electrical interfaces and allowing external loads to be connected to the electrical utility supply when the housing is connected to the electrical utility supply with the faceplate attached, the electrical outlet accessible through a first opening in the faceplate;
a cavity disposed within the front face of the housing allowing the insertion and removal of a demountable insert when the housing is mounted within the electrical utility work box with the faceplate attached and comprising a first part of a retention means to retain the demountable insert when inserted into the cavity, the cavity accessible through a second opening in the faceplate and comprising a plurality of first contacts, each first contact electrically coupled to a predetermined electrical interface of the housing; and the demountable insert sized for insertion into the cavity within the front face of the housing and providing a function independent of the electrical outlet, the demountable insert capable of insertion and removal when the faceplate is attached to the housing, the demountable insert comprising a second part of the retention means to retain the demountable insert when inserted into the cavity;

the demountable insert includes an interface according to a predetermined standard, the interface allowing at least one of:

allowing external control of the connection of the electrical outlet to the electrical utility supply when the demountable insert is inserted into the housing with the faceplate attached;

connection of an external device to a computer network via the electrical utility supply; and connection of an external device to a computer network coupled to the housing via a communications interface.

15. A device for use in conjunction with a conventional electrical utility work box and a faceplate comprising:

a housing to fit within an electrical utility work box comprising at least a front face, the housing comprising;

a first mounting means to affix the housing to the electrical utility work box;

a second mounting means to affix the faceplate to the housing;

a plurality of electrical interfaces, each electrical interface allowing connection to a predetermined electrical signal forming part of an electrical utility supply;

an electrical outlet disposed within the front face of the housing forming a permanent part of the housing, the electrical outlet permanently connected to the plurality of electrical interfaces and allowing external loads to be connected to the electrical utility supply when the housing is connected to the electrical utility supply with the faceplate attached, the electrical outlet accessible through a first opening in the faceplate;

a cavity disposed within the front face of the housing allowing the insertion and removal of a demountable insert when the housing is mounted within the electrical utility work box with the faceplate attached and comprising a first part of a retention means to retain the demountable insert when inserted into the cavity, the cavity accessible through a second opening in the faceplate and comprising a plurality of first contacts, each first contact electrically coupled to a predetermined electrical interface of the housing; and the demountable insert sized for insertion into the cavity within the front face of the housing and providing a function independent of the electrical outlet, the demountable insert capable of insertion and removal when the faceplate is attached to the housing, the demountable insert comprising a second part of the retention means to retain the demountable insert when inserted into the cavity;

the demountable insert is a wireless networking bridge operating according to a first predetermined wireless standard, the wireless networking bridge at least one of:

connected to an externally accessible network jack;

connected to an externally accessible socket;

connected to a wireless network operating according to a second predetermined standard.

16. A device for use in conjunction with a conventional electrical utility work box and a faceplate comprising:

a housing to fit within an electrical utility work box comprising at least a front face, the housing comprising;

a first mounting means to affix the housing to the electrical utility work box;

a second mounting means to affix the faceplate to the housing;

a plurality of electrical interfaces, each electrical interface allowing connection to a predetermined electrical signal forming part of an electrical utility supply;

an electrical outlet disposed within the front face of the housing forming a permanent part of the housing, the electrical outlet permanently connected to the plurality of electrical interfaces and allowing external loads to be connected to the electrical utility supply when the housing is connected to the electrical utility supply with the faceplate attached, the electrical outlet accessible through a first opening in the faceplate;

a cavity disposed within the front face of the housing allowing the insertion and removal of a demountable insert when the housing is mounted within the electrical utility work box with the faceplate attached and comprising a first part of a retention means to retain the demountable insert when inserted into the cavity, the cavity accessible through a second opening in the faceplate and comprising a plurality of first contacts, each first contact electrically coupled to a predetermined electrical interface of the housing;

the demountable insert sized for insertion into the cavity within the front face of the housing and providing a function independent of the electrical outlet, the demountable insert capable of insertion and removal when the faceplate is attached to the housing, the demountable insert comprising a second part of the retention means to retain the demountable insert when inserted into the cavity; and the demountable insert comprises an electrical mains interface allowing external loads to be connected to the electrical utility supply, the electrical mains interface at least one of according to a standard other than that of the electrical utility supply and an externally accessible socket of the insert connected to the insert by an electrical cable.

17. A device for use in conjunction with a conventional electrical utility work box, a housing for mounting to the conventional electrical utility box and a faceplate for mounting to the housing comprising:

a demountable insert sized for insertion into a cavity within a front face of the housing facing a user when mounted to the electrical utility box and providing a function independent of an electrical outlet within the housing, the demountable insert capable of insertion and removal from the housing through an opening within the faceplate when the faceplate is attached to the housing and the housing is mounted within the electrical utility work box, the cavity within the housing also comprising a first part of a retention means and the demountable insert comprising a second part of the retention means to retain the demountable insert when inserted into the cavity within the front face of the housing;

the demountable insert is a wireless networking bridge operating according to a first predetermined wireless standard, the wireless networking bridge at least one of:

connected to an externally accessible network jack;

connected to an externally accessible socket;

connected to a wireless network operating according to a second predetermined standard.

\* \* \* \* \*